United States Patent [19]

Sadri

[11] Patent Number: 4,595,324
[45] Date of Patent: Jun. 17, 1986

[54] IMPULSE RESISTANT BLIND FASTENER

[75] Inventor: Shahriar M. Sadri, Los Angeles, Calif.

[73] Assignee: Monogram Industries, Inc., Culver City, Calif.

[21] Appl. No.: 425,163

[22] Filed: Sep. 28, 1982

[51] Int. Cl.$^4$ .................................. F16B 13/04
[52] U.S. Cl. ............................. 411/38; 411/41; 411/311
[58] Field of Search .................. 411/34–43, 411/54, 167, 259, 308–311, 417

[56] References Cited

U.S. PATENT DOCUMENTS

| | | | |
|---|---|---|---|
| 2,371,365 | 3/1945 | Tomalis et al. | 411/310 |
| 2,484,644 | 10/1949 | Poupitch | 411/311 |
| 2,484,645 | 10/1949 | Baumle | 411/311 |
| 3,129,630 | 4/1964 | Wing et al. | 411/43 |
| 3,196,918 | 7/1965 | Hampton | 411/311 |
| 3,203,303 | 8/1965 | Laisy | 411/39 |
| 3,643,544 | 2/1972 | Massa | 411/43 |
| 4,273,175 | 6/1981 | Capuano | 411/310 |
| 4,457,652 | 7/1984 | Pratt | 411/34 |

FOREIGN PATENT DOCUMENTS 601865  7/1960  Canada .......................... 411/54

Primary Examiner—Thomas J. Holko
Assistant Examiner—Neill Wilson
Attorney, Agent, or Firm—Pretty, Schroeder, Brueggemann & Clark

[57] ABSTRACT

In a blind fastener comprising a nut with an axial bore therethrough and a bolt having a stem extending through said nut, the improvement comprising said bolt stem having an altered thread section adjacent to the bolt head which upon the setting of said fastener is adapted to interfere with the threading of said nut onto said bolt so that the torsional resistance thereto is substantially increased compared to the axial resistance during the completion of said fastener setting.

4 Claims, 12 Drawing Figures

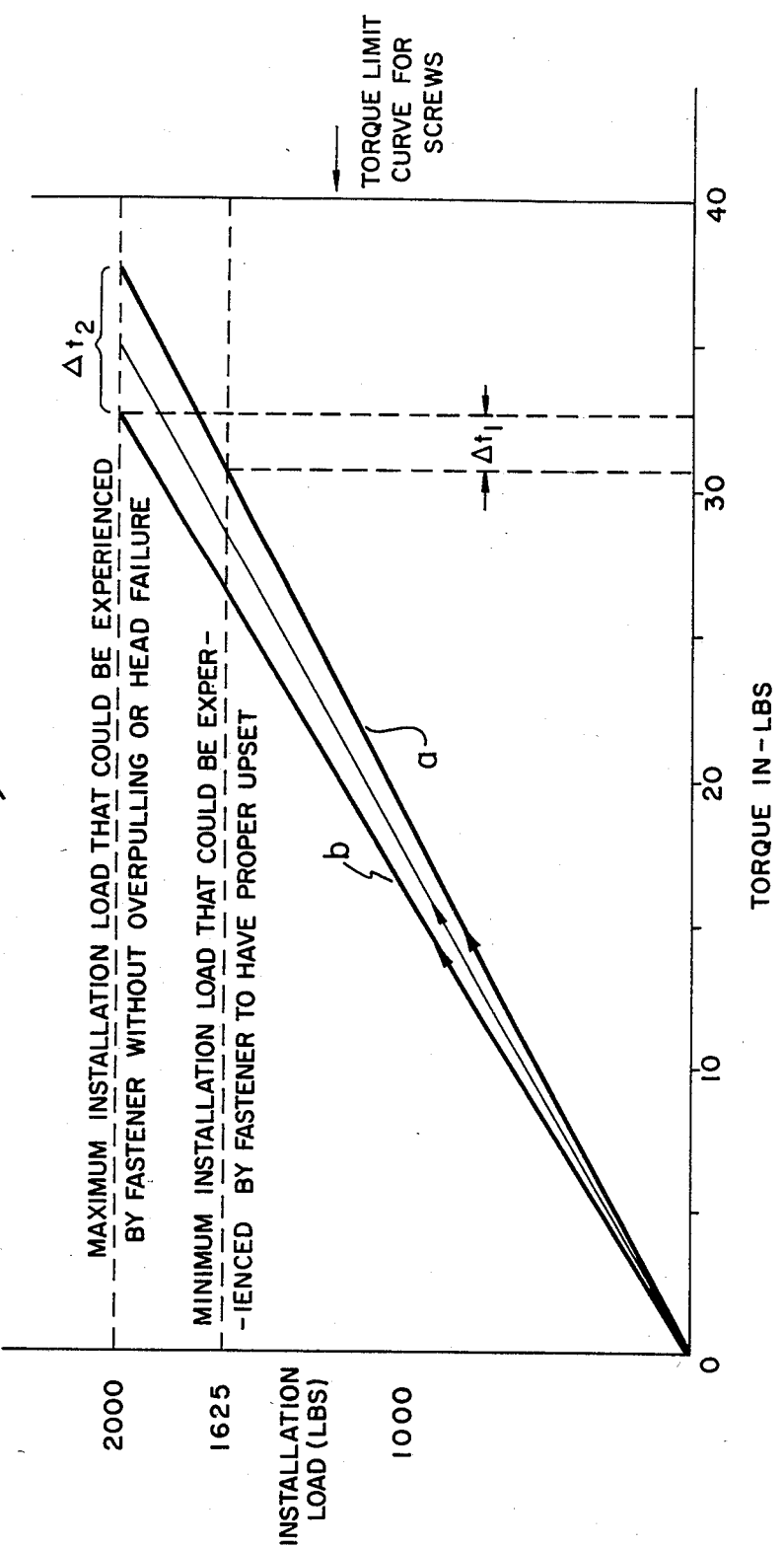

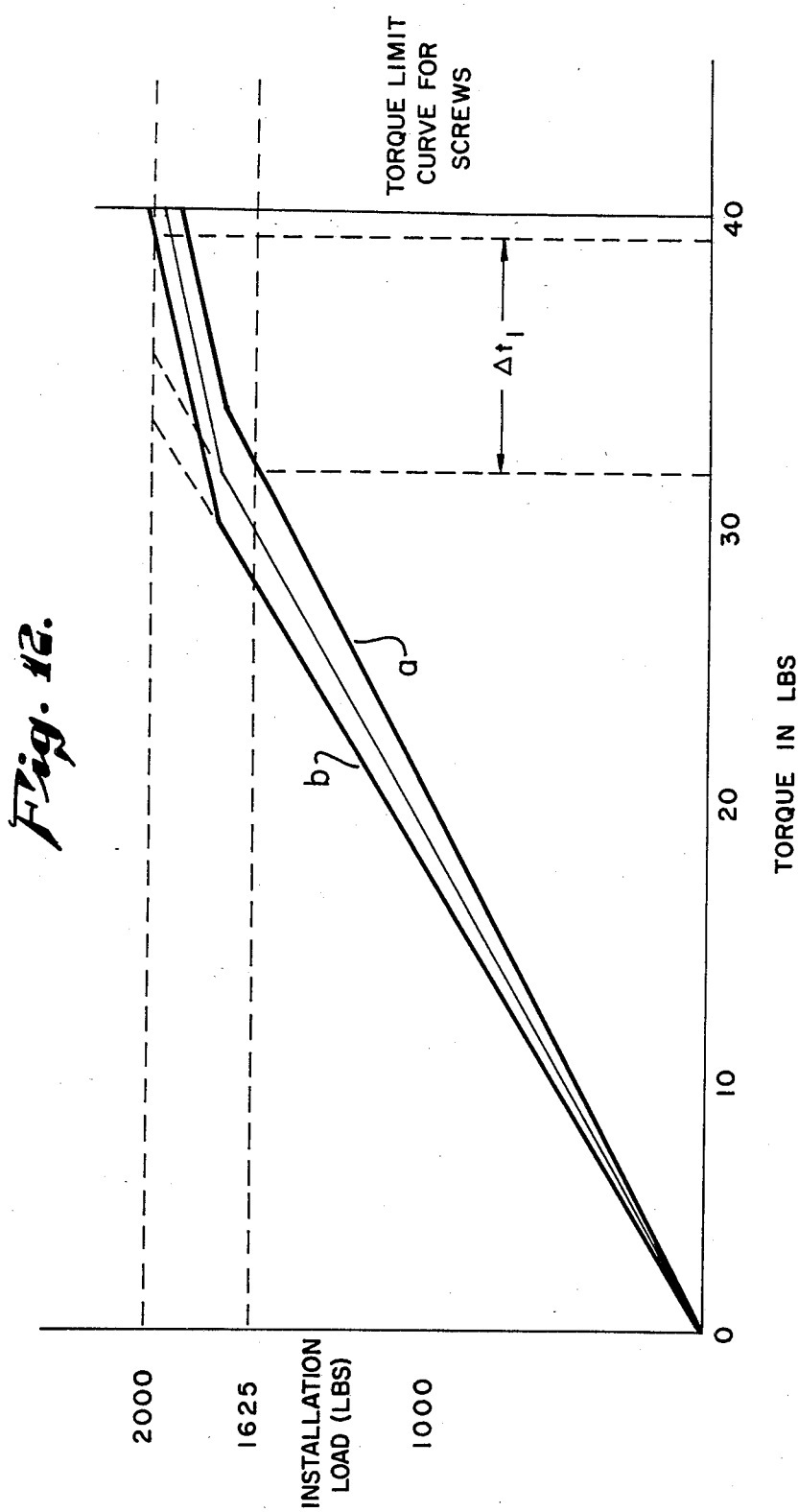

IMPULSE RESISTANT BLIND FASTENER

BACKGROUND OF THE INVENTION

This invention relates to blind fasteners and more particularly to blind fasteners utilized in fastening sheets of material which are relatively soft.

As discussed in the co-pending patent application by John D. Pratt entitled "COMPOSITE BUCKLING BLIND FASTENER" Ser. No. 253,783 filed Apr. 13, 1981, now U.S. Pat. No. 4,457,652 and assigned to the same assignee as this patent application, three piece blind fasteners have been known and used for many years wherein the three pieces consist of a nut threaded onto a bolt and an expansible sleeve is located therebetween. In addition there are corresponding two piece blind fasteners wherein such sleeve is either missing or is initially integrally attached to the bolt head. A problem which has been encountered with respect to all such fasteners is that when completing the setting of such fastener substantial axial resistance is usually generated and, on occasion, can become so large as to shear off the bolt head thereby rendering the fastener useless. The main reason that such bolt head shearing occurs is that when the fastener is being set the setting action is caused primarily by the sudden contact of the nut nose with the bolt head which sets up sufficient axial resistance to cause the end of the bolt stem to sever at the breakoff neck. In other words, when the nut reaches the point of thread runout near the bolt head, an impulse load would be applied to the bolt head which may be so high in magnitude that breaks off the bolt head. It is the impulse of the contact between the nut and the bolt head which is designed to break the bolt stem at the breakoff neck but it may also break off the bolt head. Conventionally, such problem has been attacked by regulating the lubrication of the fastener parts so that sufficient torsional resistance is generated during the setting of the fastener and therefore the amount of axial resistance is thereby reduced. However, such approach requires careful control of the lubrication of such parts of the fastener parts and even then there are problems of reproducibility.

Such problem has been substantially aggravated by the advent of the useage of relatively soft material such as a graphite composite or the utilization in structures in which very thin sheets of material are being utilized. In such situation the force applied by the sleeve or bolt head on the blind side surface may be sufficiently high to deform the blind side surface and weaken the sheet at that point.

Consequently, an object of the present invention is a blind fastener which can substantially reduce the impulse on the bolt head during the completion of the setting of the fastener.

Another object of the present invention is a blind fastener which substantially increases the torsional resistance during the completion of the setting of the fastener compared to the axial resistance.

Still another object of the present invention is a blind fastener which has improved locking action.

Another object of the present invention is a blind fastener having an altered thread section in the bolt stem adapted to compensate for the varying tolerances of the fastener parts and to permit substantial clamping action during the completion of the setting of the fastener without shearing off the bolt head.

Other objects and advantages in the present invention will be readily apparent from the following description and drawings which illustrate a preferred exemplary embodiment of the present invention.

SUMMARY OF THE INVENTION

In general, the present invention involves a blind fastener comprising a nut with an axial bore therethrough and with a nose at one end and an enlarged head at the other end. Extending through said nut is a bolt having a stem and having an enlarged head adjacent to said nut nose. The improvement of the present invention comprises said bolt stem having an altered thread section adjacent to the bolt head which upon setting of the fastener is adapted to interfere with the threading of said nut onto said bolt so that the torsional resistance thereto is substantially increased compared to the axial resistance during the completion of said fastener setting.

In order to facilitate understanding of the present invention, reference will now be made to the appended drawings of a preferred specific embodiment of the present invention. Such drawings, like the preceding summary, should not be construed as limiting the present invention which is properly set forth in the appended claims.

DESCRIPTION OF DRAWINGS

FIG. 11 is a graph of typical installation curves for prior art fasteners.

FIG. 12 is a graph of typical installation curves for the fastener of the present invention.

DETAILED DESCRIPTION OF THE PREFERRED EMBODIMENTS

Figure 1:
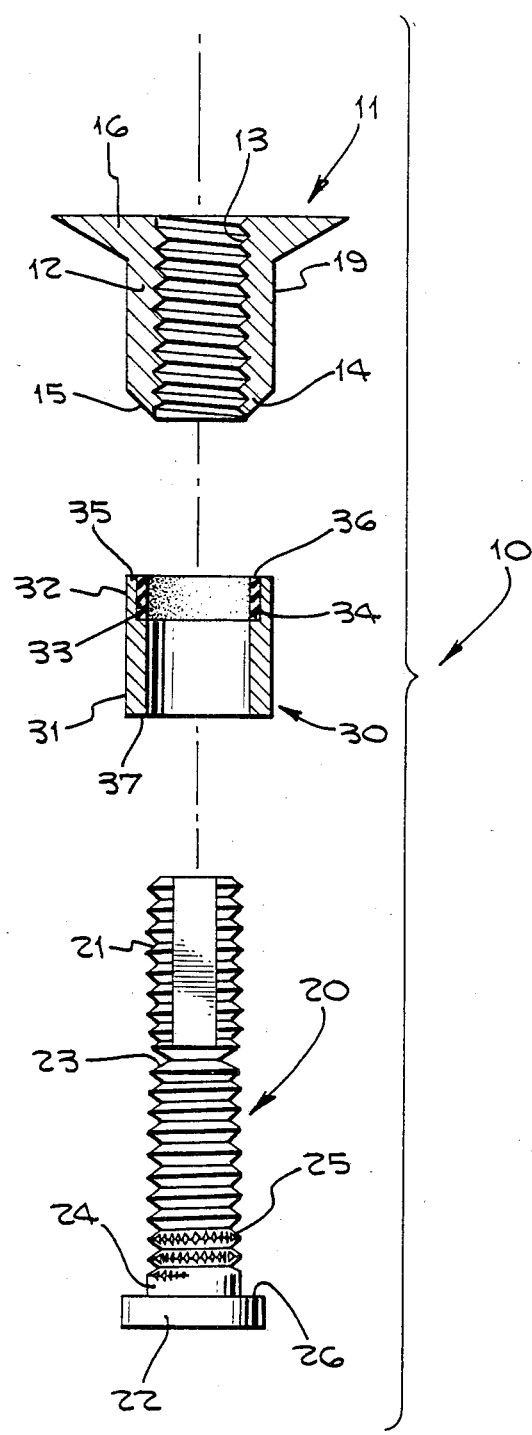
FIG. 1 is an exploded view of the fastener of the present invention.
Figure 2:
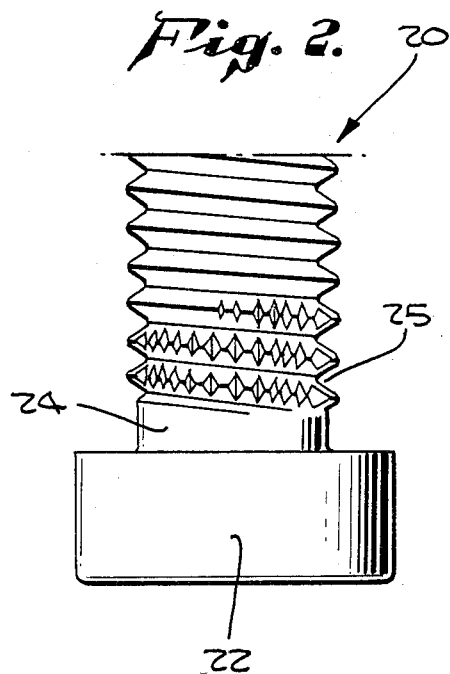
FIG. 2 is an enlarged view of the corebolt head showing thread alteration.

As illustrated in FIG. 1, the blind fastener 10 comprises a nut 11, a bolt 20 and a sleeve 30. The nut 11 has a body 12 with an axial bore 13 therethrough. The mean diameter (when threaded) of the bore 13 is about 55% to 70% of the external diameter of the body 12. At one end of the nut 11 is a nose 14 bearing a conically shaped chamfer 15 at an angle of about 12° to 30° to the axis of the nut 11. At the other end of the nut 11 is an enlarged head 16 adapted to seat against the open side of the parts 17 and 18 (FIG. 4) being fastened. The length of the nut 11 is adapted to extend the external surface 19 of the body 12 beyond the blind side of the parts being fastened even in the maximum grip situation by a distance sufficient to permit the thin wall section 32 of the sleeve 30 to adapt to the external surface 19 of the nut body 12, particularly in connection with the collar 35.

The bolt 20 has a stem 21 extending through the nut 11 and an enlarged head 22 with an inner surface 26 adjacent to the nut nose 14 when the nut 11 is assembled on the bolt 20. The diameter of the head 22 is customarily equal to the diameter of the nut body 12. In the stem 21 of the bolt 20 is a breakneck 23 adapted to fracture when a preselected stress is applied to the bolt stem 21 during the installation of the fastener 10. Such fracture is designed to occur when the breakneck is located flush with or slightly above the open side of the parts being fastened by the blind fastener upon completion of the installation of the blind fastener. Adjoining the head 22 is an unthreaded blank section 24 of the stem 21. The length of such blank section is customarily at most about 10% of the grip length of the bolt stem. The term "grip length" as used herein is used in its customary sense of the distance along the bolt stem from the bolt head inner surface 26 to the breakneck 23.

Figure 6:
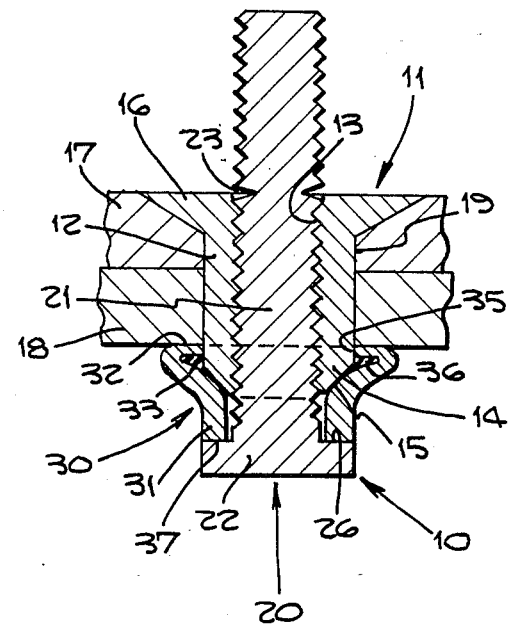
FIG. 6 is the fastener of FIG. 3 except that it shows the configuration of the finally installed fastener of the present invention.

Adjoining the blank section 24 is an altered thread section 25 which is formed by a series of straight knurls formed in the bolt stem standard threads around the circumference of the bolt stem and substantially parallel to the axis of the bolt stem. The length of said altered thread section 25 may be from 10% to 50% of the grip length of the bolt stem but is preferably from about 20% to 40% of the grip length of the bolt stem. As shown in FIG. 6 discussed below, the altered thread section 25 may be spaced from the end of the threaded portion of the bolt stem adjacent to the bolt head by a distance of up to about 30% of the grip length of the bolt stem. Thus, the altered thread section 25 may be spaced from but adjacent to the blank section 24 rather than adjoining to it.

On the bolt stem 21 between the nut nose 14 and the bolt head 22 is a sleeve 30 having a thick wall section 31 adjacent to the bolt head 22 and a thin wall section 32 adjacent to the nut nose 14 formed by a recess 33 in said thin wall section 32. Thin wall section 32 has a free end 36 and the thick wall section 31 has a free end 37. The length of the thin wall section 32 of sleeve 30 is about 20% to 50% of the length of the sleeve 30 and preferably is about 30% to 45% of the length of the sleeve 30. The wall thickness of the thin wall section 32 of the sleeve 30 is about 5% to 20% of the outside diameter of the sleeve 30. The thickness of the thin wall section 32 is about 50% to 70% of the thickness of the thick wall section 31. Between the thick wall section 31 and thin wall section 32 is a shoulder 34. The external diameter of the sleeve 30 is customarily equal to the diameter of the nut body 12. Set in the thin wall recess 33 is a collar 35 which is the same length as the thin wall recess 33; however, depending on the relative tensile strength of the collar 35 and the sleeve 30, the length of the collar 35 may be between about 50% and 100% of the length of the wall recess 33. The tensile strength of the collar material is about 5% to 30% of the tensile strength of the sleeve material but is preferably about 10% to 20% of the tensile strength of the sleeve material.

Figure 3:
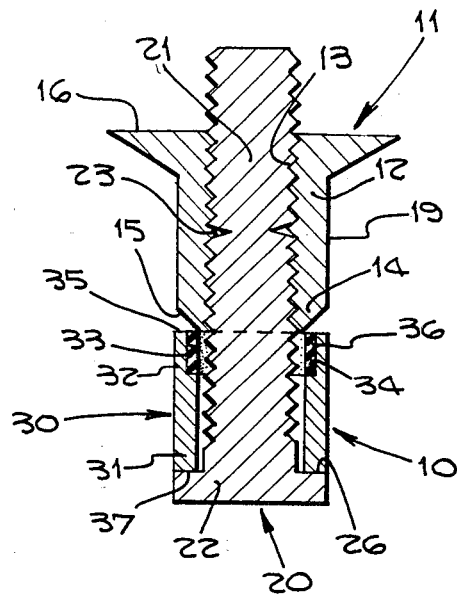
FIG. 3 is an axial cross sectional view of the assembled fastener of the present invention prior to installation.
Figure 4:
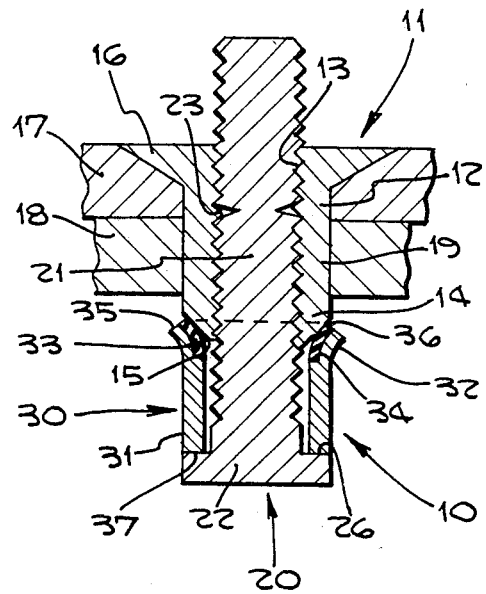
FIG. 4 is the fastener of FIG. 3 except that it shows the initial portion of the installation process of the fastener of the present invention.

Except for the function and results of the altered thread section 25 described below, the operation of the blind fastener 10 will be described in connection with FIGS. 3–6. In FIG. 3, the blind fastener 10 is shown in its assembled form prior to the initiation of the setting operation. As shown in FIG. 4, as the bolt 20 is threaded into the nut 11, the collar 35 adjoining the free end 36 of the thin wall section 32 contacts the chamfer 15 of the nut nose 14 and causes the free end 36 to expand outwardly. As illustrated in FIG. 4, upon the bolt 20 continuing to be threaded into the nut 11, the collar 35 and the thin wall section 32 proceed over the body 12 of the nut 11; however, because of the stress applied by the high tensile strength thin wall section 32 to the low tensile strength collar 35, the free end 36 of the thin wall section 32 tapers inwardly toward the external surface 19 of the body 12 displacing a portion of the collar 35 and does not become aligned with the body 12.

Consequently, the thin wall section 32 assumes a buckling mode which curves substantially at the free end 36 adjacent to the blind side of the part 18. Thus, as shown in FIG. 6, upon contact with the blind side of the part 18, the thin wall section 32 buckles outwardly without substantial pressure being applied to the free end 36 to the blind side of part 18 and with a uniform large bearing surface approximately circular in shape and having a diameter of about 150% to 200% of the external diameter of the nut body 12.

Figure 5:
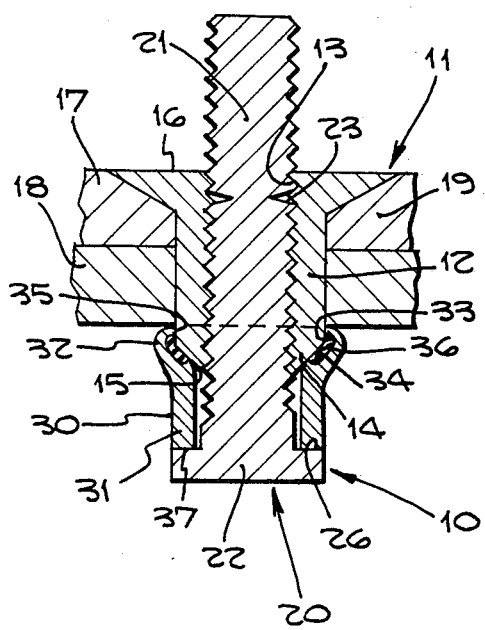
FIG. 5 is the fastener of FIG. 3 except that it shows the intermediate portion of the installation process of the fastener of the present invention.

As set forth above, the foregoing description of the operation of the fastener does not incorporate a description of the function and results of the altered thread section 25 but rather substantially follows the description set forth in the aforementioned co-pending patent application. However, it can be seen from such description, that the setting of the blind fastener 10 causes the free end 37 of the sleeve 30 to exert a very substantial axial force on the inner surface 26 of the bolt head 22 particularly during the last phase of the setting of the fastener illustrated in FIG. 6. Up to such last phase, the axial force exerted on the bolt stem 21 was relatively negligible since it arises primarily from the frictional forces set up between the free end 37 of the thick wall section 31 of the sleeve 30 and the inner surface 26 of the bolt head 22 while the parts 17 and 18 are being clamped together. Thus, for example, for the specific example of the blind fastener described below, at the setting stage approximately as indicated in FIG. 5, the axial stress on the bolt is 148 ksi while the torsional stress on the bolt is about 99 ksi. However, when the last stage of setting (approximately as shown in FIG. 6) immediately prior to the shearing off of the bolt stem occurs, the axial stress on the bolt is 183 ksi and the torsional stress is 108 ksi. Since the bolt head 22 for such specific example shears off at approximately 205 ksi axial stress, it can be seen that even under normal circumstances that only a modest increase in axial stress will result in shearing off of the bolt head. Such problem is particularly acute during the installation process where the impulse is dissipated over a time period of approximately 0.1 seconds so that the impulse received by the bolt head is quite substantial and in addition to the axial force noted above. With the addition of the altered thread section 25, when the phase of the setting of the fastener 10 is reached approximately as illustrated in FIG. 5, the torsional resistance is substantially increased and increased generally proportional to the length of the threaded portion of the nut body 12 which is engaged with the altered thread section 25 of the bolt stem 21. Consequently, when the last phase of the setting operation is achieved as illustrated in FIG. 6, the torsional resistance is substantially increased relative to the axial stress so the resulting impulse which is received by the bolt head 22 is substantially reduced. Thus, in the specific example described below, the actual axial stress immediately prior to the breaking off of the bolt stem is about 165 ksi and the torsional stress is about 125 ksi. Such resulting torsional force, of course, results in a locking action on the nut 11 which continues after the breaking off of the bolt stem.

Figure 7:
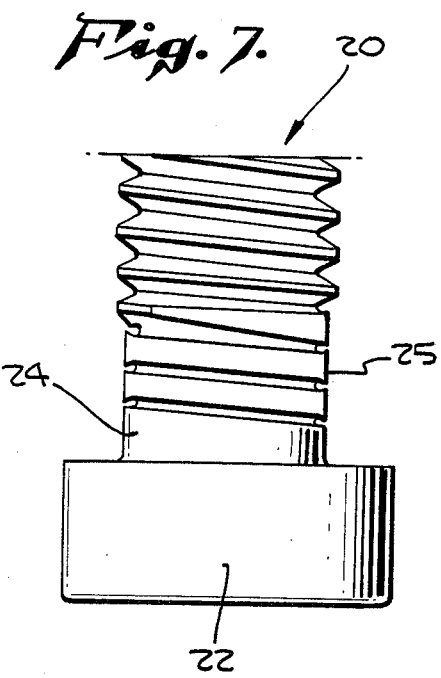
FIG. 7 is an enlarged view of another embodiment of the bolt head and the adjoining portion of the bolt stem of the fastener of the present invention.
Figure 8:
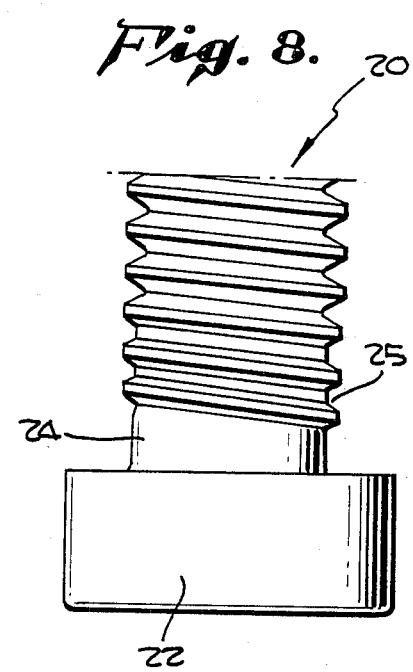
FIG. 8 is an enlarged view of still another embodiment of the bolt head and adjacent portion of the bolt stem of the fastener of the present invention.
Figure 9:
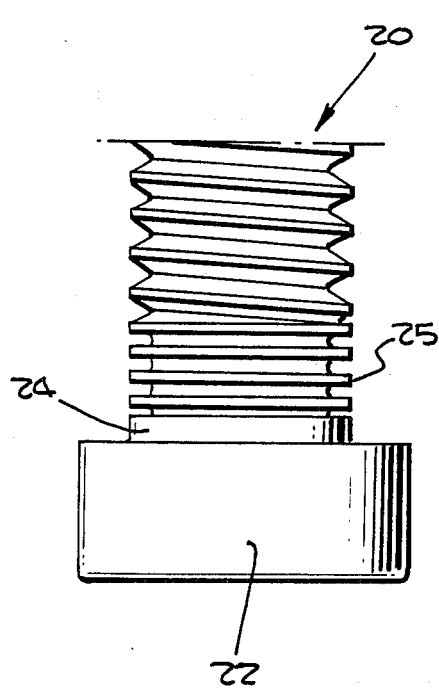
FIG. 9 is an enlarged view of still another embodiment of the bolt head and adjacent portion of the bolt stem of the fastener of the present invention.
Figure 10:
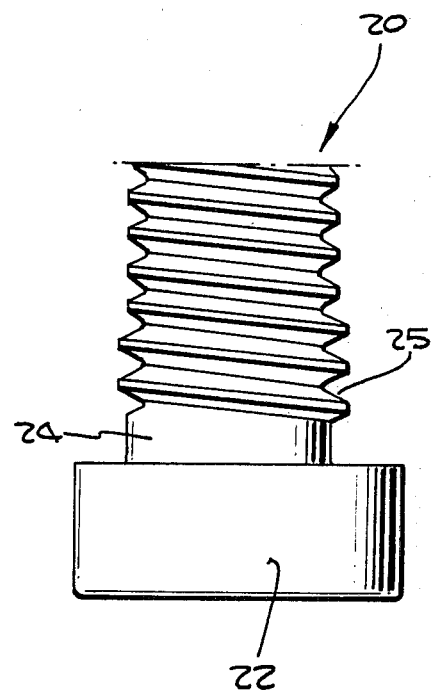
FIG. 10 is an enlarged view of still another embodiment of the bolt head and adjacent portion of the bolt stem of the fastener of the present invention.

As shown in FIG. 7, an alternate embodiment of the present invention includes an altered thread section 25 which is achieved by flat rolling the standard threads; however, in addition, the altered thread section is spaced from the blank section 24 by a section of standard threads which are the same as the remaining threads in the bolt stem. As shown in FIG. 8, still another embodiment of the present invention includes an altered thread section 25 wherein the minor diameter of the threads are tapered to produce a shallower cross section compared to the taper of the standard threads. As shown in FIG. 9, still another alternate embodiment of the present invention is an altered thread section 25 which is formed by imposing a helical knurl on the end of the threads. As shown in FIG. 10, still another alternate embodiment of the present invention is an altered thread section 25 which has a different pitch from the standard threads.

Still other embodiments of the present invention may include other alterations in the thread provided the result is to form an interference with the nut threads being threaded onto the bolt stem. Similarly, as noted above, the fastener may be formed of two pieces one of which would be the bolt the other of which would be the nut either having the sleeve integral with the nut or with no sleeve at all.

As illustrated in FIG. 11, prior art fasteners typically exhibit a range of installation curves for applied torque giving a resulting installation load which range ($\Delta t_2$) depends on the degree of lubrication of the individual fastener, i.e., for the less lubricated fastener (curve a), a given amount of applied torque gives less resulting installation load and, conversely, for the more lubricated fastener (curve b) a given amount of applied torque gives more resulting installation load. Consequently, the allowable torque range ($\Delta t_1$) is relatively narrow. If the applied torque is less than the allowable torque range, for less lubricated fasteners (curve a), the torque does not give proper upset. Conversely, if the applied torque is greater than the allowable torque range, for more lubricated fasteners (curve b) the torque would cause overpulling or head failure.

As illustrated in FIG. 12, the fastener of the present invention also exhibits a range of installation curves for applied torque giving a resulting installation load which range depends on the degree of lubrication of the individual fastener. However, because of the effect of the present invention, each of the curves changes to a lower slope between the minimum installation load and maximum installation load. In other words, as the threads of the nut 11 engage the threads of the bolt 20 in the altered thread section 25, a greater increase in torque is required to give the same resulting increased installation load. More important is the effect which substantially increases the allowable torque range ($\Delta t_1$), i.e., from a range of about 1.85 in.-lbs. to about 8.5 in.-lbs. As illustrated, the lower limit to such range is not affected. However, the upper limit to such range is substantially increased, i.e., it takes a substantially large torque before overpulling or head failure occur. Consequently, the present invention compensates not only for inconsistencies caused by variations in lubrication but also inconsistencies caused by variations in heat treat, threads and other factors. In other words, the present invention achieves proper installation while permitting looser manufacturing specifications on the fastener parts.

The major dimensions (in inches) of a specific example (MBF2011-6-100 reduced protruding hex head) of the blind fastener of the present invention are as follows:

| finished nut: | |
|---|---|
| across flats dimension | maximum .312 |
| | minimum .305 |
| nut tap size | 60-40NS-2B-LH |
| nut body diameter | maximum 0.1985 |
| | minimum 0.1975 |
| nut length (including head and nose) | 0.300 |
| finished bolt: | |
| head diameter | maximum 0.1965 |
| | minimum 0.1940 |
| stem thread designation | 60-40NS-2A |
| bolt length (including head) | maximum 0.916 |
| | minimum 0.906 |
| altered thread section length | maximum .085 |
| | minimum .080 |
| altered thread section spacing from head | maximum 0.055 |
| sleeve: | |
| total length | maximum 0.350 |
| | minimum 0.345 |
| thin wall section length | 0.125 ± 0.002 |
| external diameter | maximum 0.1965 |
| | minimum 0.1960 |
| thin wall section (internal diameter) | maximum 0.167 |
| | minimum 0.165 |
| thick wall section | maximum 0.1465 |
| | minimum 0.1445 |
| collar: | |
| length | maximum 0.123 |
| | minimum 0.115 |
| external diameter | maximum 0.166 |
| | minimum 0.164 |
| internal diameter | maximum 0.141 |
| | minimum 0.139 |
| buckled thin wall section diameter | minimum 0.300 |

The materials utilized in the blind fastener of the present invention, of course, vary depending upon the application for which such blind fastener is intended. However, as a specific example, the nut may be made of Ti-6AL-4V titanium alloy or A-286 stainless steel. The nut may utilize a variety of head styles such as the flush head defined in AN509, MS20426, NAS1097 or a protuding head with a driving recess as defined in NAS1669. The bolt may be made out of the same materials as the nut. The sleeve may be made out of materials such as A-286 or 304 stainless steel. The collar is preferably made out of low tensile strength plastic materials such as Delron, Celcon, Teflon, nylon or fiberglass reinforced versions of the above; however, soft metals such as aluminum, copper and nickel may be utilized provided the tensile strength of the sleeve is sufficiently larger than the tensile strength of the collar as discussed above. A specific example of a set of materials is that the nut, bolt and sleeve are composed of A-286 stainless steel (tensile strength of nut and bolt approximately 180 ksi and tensile strength of sleeve approximately 75 ksi) and the collar composed of Delron acetal rod (tensile strength 8 to 12 ksi).

There are many features in the present invention which clearly show the significant advantage which the present invention achieves over the prior art. Consequently, only a few of the more outstanding features will be pointed out to illustrate the unexpected and unusual results obtained by the present invention. One feature of the present invention is a blind fastener which relies primarily upon the torsional resistance to break off the bolt stem at the desired phase of installation and thereby permits compensation for a number of tolerance errors in the fastener parts. Still another feature of the present invention is a blind fastener which utilizing an altered thread section increases the torsional resistance proportionally to the threading of the nut onto such altered thread section to accurately control the breaking off of the bolt stem. Still another feature of the present invention is a blind fastener with an altered thread section which permits the driving torque energy to be translated gradually into friction and heat and thus dissipate the impulse force due to thread runout upon driving. Still another feature of the present invention is a blind fastener having an altered thread section which substantially increases the locking force upon the nut and such locking force is generally proportional to the extent of the engagement of the nut threads with the altered thread section. Still another feature of the present invention is a blind fastener wherein by adjustment of the location of an altered thread section, the initial increase of torsional resistance during setting can be selectively determined.

It will be understood that the foregoing description and drawings are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

What is claimed is:

1. In a blind fastener comprising (a) a nut having a nut body with a threaded axial bore therethrough and with a nose at one end and an enlarged head at the other end, and (b) a bolt having a threaded stem extending through said nut and having an enlarged head at one end and a terminal end at the other end, the threads of said bore adapted to mate with the threads of said stem, a breakneck portion on said stem intermediate said terminal end and said enlarged bolt head, and a sleeve of deformable material on said bolt stem between said nut nose and said bolt head, said sleeve being generally cylindrical and smooth-walled on its inner surface, the improvement which comprises said sleeve having a thick wall section adjacent said bolt head and a thin wall section having a thickness less than said thick wall section adjacent said nut nose forming a recess in said thin wall section adjacent said nut nose having a shoulder on the interior of said sleeve at the intersection of said thin wall section with said thick wall section, the external diameter of said sleeve being generally equal to the outer diameter of said nut body, and a collar disposed in said recess having one end generally flush with the end of said thin wall section adjacent said nut nose and the other end abutting against said shoulder, the overall thickness of said collar and said thin wall section being substantially the same as the overall thickness of said thick wall section, the interior of said collar being generally smooth and planar with respect to the interior of said thick wall section, the tensile strength of said collar being substantially less than the tensile strength of said sleeve, the improvement further comprising said bolt stem having an altered thread section adjacent to said bolt head formed by a series of spaced independent straight knurls, substantially parallel to the axis of the bolt, formed in the bolt stem standard threads, which, upon the setting of said fastener, are adapted to interfere with the threading of said nut onto said bolt and the engagement of the thread of said bore with the first mentioned threads of said stem so that the torsional resistance thereto is substantially increased compared to the axial resistance during the completion of said fastener setting thereby preventing premature shearing of the bolt head before break off of the bolt stem at the breakneck portion when the blind fastener is installed in an installation and said sleeve had been forced by said bolt head up over said nut nose until said sleeve engages the installation in which said blind fastener is installed and said sleeve deforms at said collar and thin wall section when said collar and said thin wall section abuts against the installation in which the fastener is installed.

2. A blind fastener as stated in claim 1 wherein the length of said altered thread section is about from 10% to 50% of the grip length of the bolt stem.

3. A blind fastener as stated in claim 2 wherein the length of said altered thread section is about from 20% to 40% of the grip length of the bolt stem.

4. A bind fastener as stated in claim 1 wherein said collar has a tensile strength of about 10% to 20% of the tensile strength of the material of said sleeve.

* * * * *